May 30, 1950 G. A. CLEMENT 2,509,211
APPARATUS FOR BLOCKING LENSES
Filed June 27, 1947 3 Sheets-Sheet 1

INVENTOR
George A. Clement
BY
ATTORNEY

May 30, 1950          G. A. CLEMENT          2,509,211
APPARATUS FOR BLOCKING LENSES
Filed June 27, 1947          3 Sheets-Sheet 2
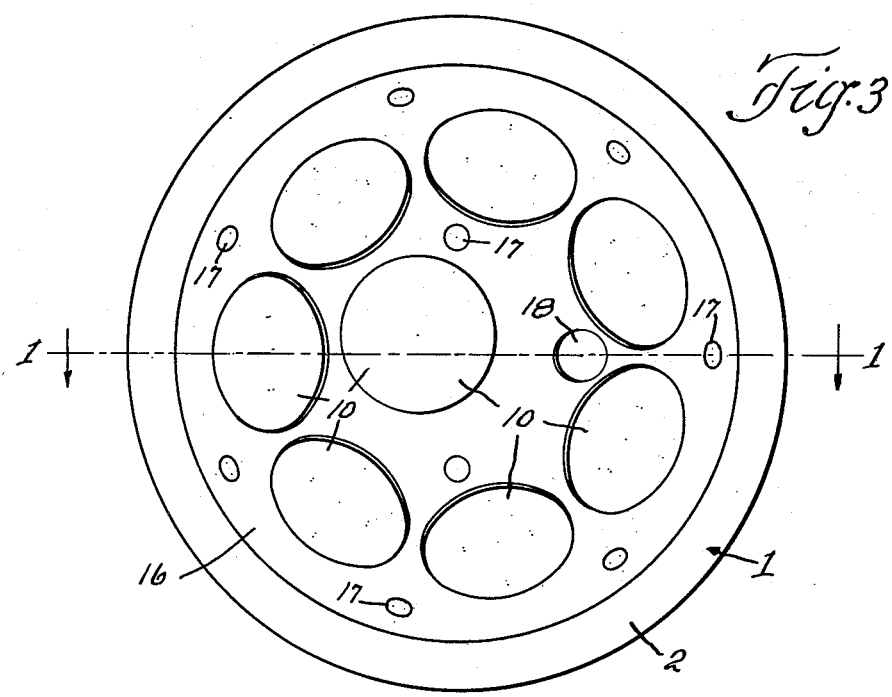
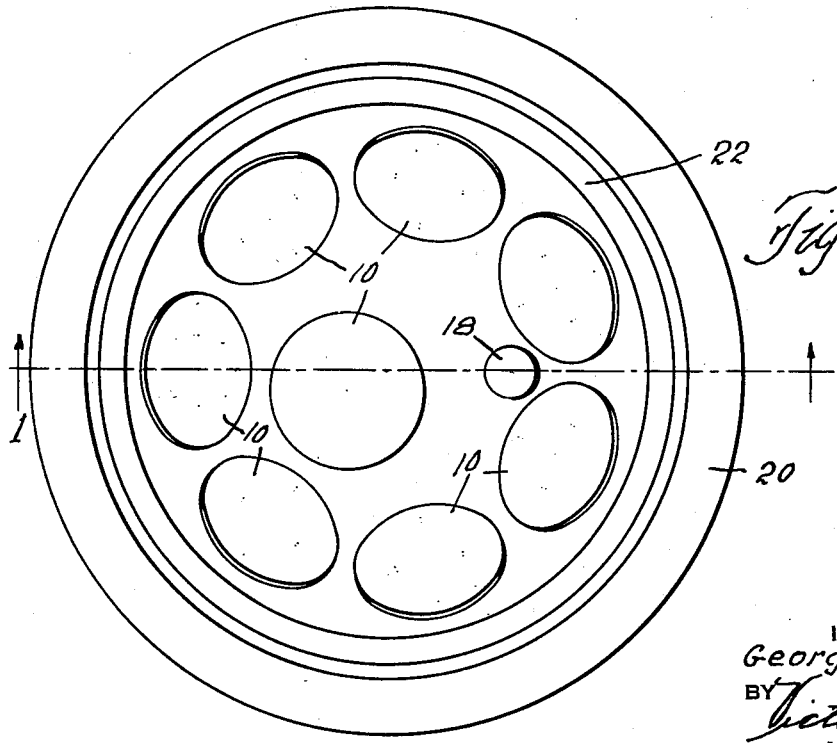
INVENTOR
George A. Clement
BY
ATTORNEY May 30, 1950  G. A. CLEMENT  2,509,211
APPARATUS FOR BLOCKING LENSES
Filed June 27, 1947  3 Sheets-Sheet 3
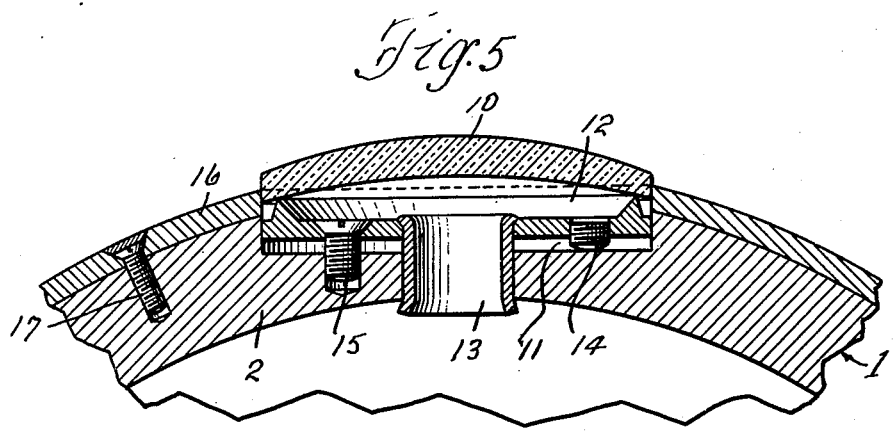
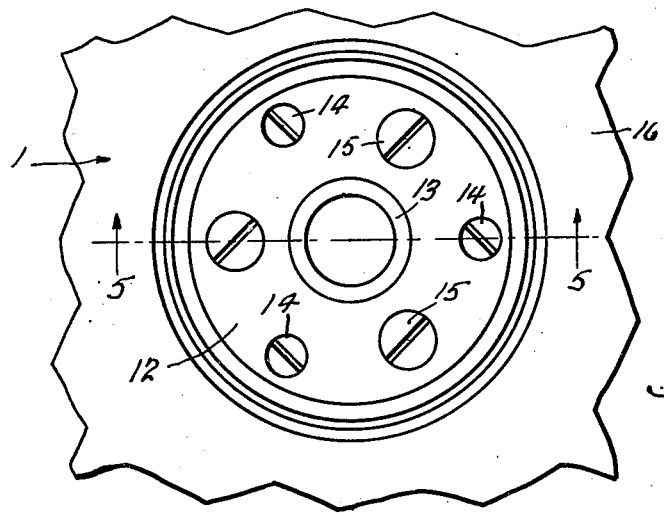
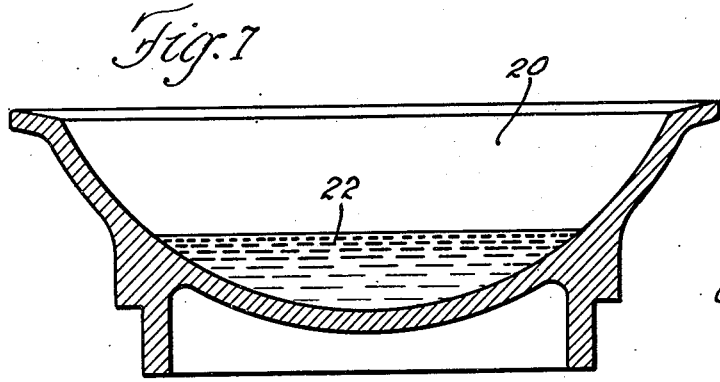
INVENTOR
George A. Clement
BY Victor D. Borst
ATTORNEY Patented May 30, 1950

2,509,211

UNITED STATES PATENT OFFICE 2,509,211

APPARATUS FOR BLOCKING LENSES

George A. Clement, Mount Vernon, N. Y.

Application June 27, 1947, Serial No. 757,628

4 Claims. (Cl. 51—277)

This invention relates to the art of blocking lenses for grinding and polishing, and has especial utility in blocking lenses for multiple grinding. For example, the occasion to block a plurality of lenses in a single block or tool for simultaneous grinding occurs in the fine grinding and polishing of surfaces on meniscus blanks that have been rough ground or generated to the desired curve. If it be the second or prescription surface that is to be fine ground and polished, especially in the case of multifocal lenses, such as bifocals, the prescription surface has been rough ground or generated at a definite axis relation to the other or bifocal surface so as to get the desired location of the optical center in the final lens. It is of importance, therefore, to block the lenses for this final grinding so as to keep that axis relationship.

In the case of meniscus, bifocal blanks, the plus or convex side is commonly finished first to some spherical base curve, and hence it is the minus or concave side that is last ground and finished. For the rough grinding of that surface, the blank is carefully mounted and held with respect to the grinder so as to give the proper location to the optical axis with respect to the reading field. When it comes to the fine grinding, it is essential to get the lenses blocked up so as to maintain these centers.

Multiple blocking is employed with a plurality of lenses or blanks rough ground to the same spherical curvature. When they are properly blocked up, all the unfinished lens surfaces become segments of a single sphere and may be fine ground and polished at one time.

The common practice for this purpose, as is well known, is to use what is termed a spot mold which is made with one or more depressions conforming with the curvature of the finished surfaces of the lenses to be blocked. The mold is coated with pitch and the lenses are heated to a temperature sufficient to soften the pitch. The lenses are put in these depressions with their finished surfaces fitting into them, and are held firmly in the pitch. To get the proper positioning of the lenses, the operator uses a wooden hand tool termed a presser. This operation is called pressing the heated lens in the pitch mold, and requires a highly skilled operator. The result depends upon the angle at which the operator holds the presser, and slight error will produce enough prism in the finished lens to render it unusable.

The present invention dispenses with the depressions in the blocking mold and uses the rough ground surface itself, rather than the surface on the other side, as the gauge or guide in the blocking. Hence the accurate positioning of the lenses is assured.

The invention contemplates what is termed a vacuum mold, in which the surface of the lenses having the generated curvatures in rough state are placed toward a spherical surface of a temporary holder and held thereon by suction, and in that manner are inserted into molten pitch in a final mold or block of complementary shape, and are held there until the pitch hardens, when the vacuum is broken and the temporary holder is removed. The blanks are thus set in pitch with their rough surfaces exposed and all parts of the same sphere.

Special means, such as tangent rings, are provided on the surface of the temporary holder to receive and hold the blanks. Also means are provided to control the precise distance that the minus faces of the blanks are below the spherical surface of the holder, which, of course, determines the height that they will protrude from the pitch.

A vacuum chuck or holder also holds a spot glass or the like at a regulatable height with respect to the surface of the spherical holder, and similarly embeds it in the pitch at such radial position that it is untouched by the grinding tool or lap until the predetermined amount is ground off the lens surfaces. When it begins to show abrasion marks, the operator knows that the grinding is completed.

The illustrated embodiment of the apparatus for performing the method will now be described, after which the invention will be pointed out in claims.

Fig. 3 is a plan of the convex vacuum mold with lenses attached.

Fig. 4 is a plan of the concave block showing the lenses blocked up in it.

Fig. 5 is a fragmentary sectional detail on enlarged scale of one of the lens holders and its adjacent parts in the vacuum mold, showing the lens as it is held, the plane of section being on line 5—5 of Fig. 6.

Fig. 6 is a plan of the parts shown in Fig. 5, with the lens removed.

Fig. 7 is a sectional elevation of the concave block with pitch in molten state and before the vacuum mold is inserted.

Figure 1:
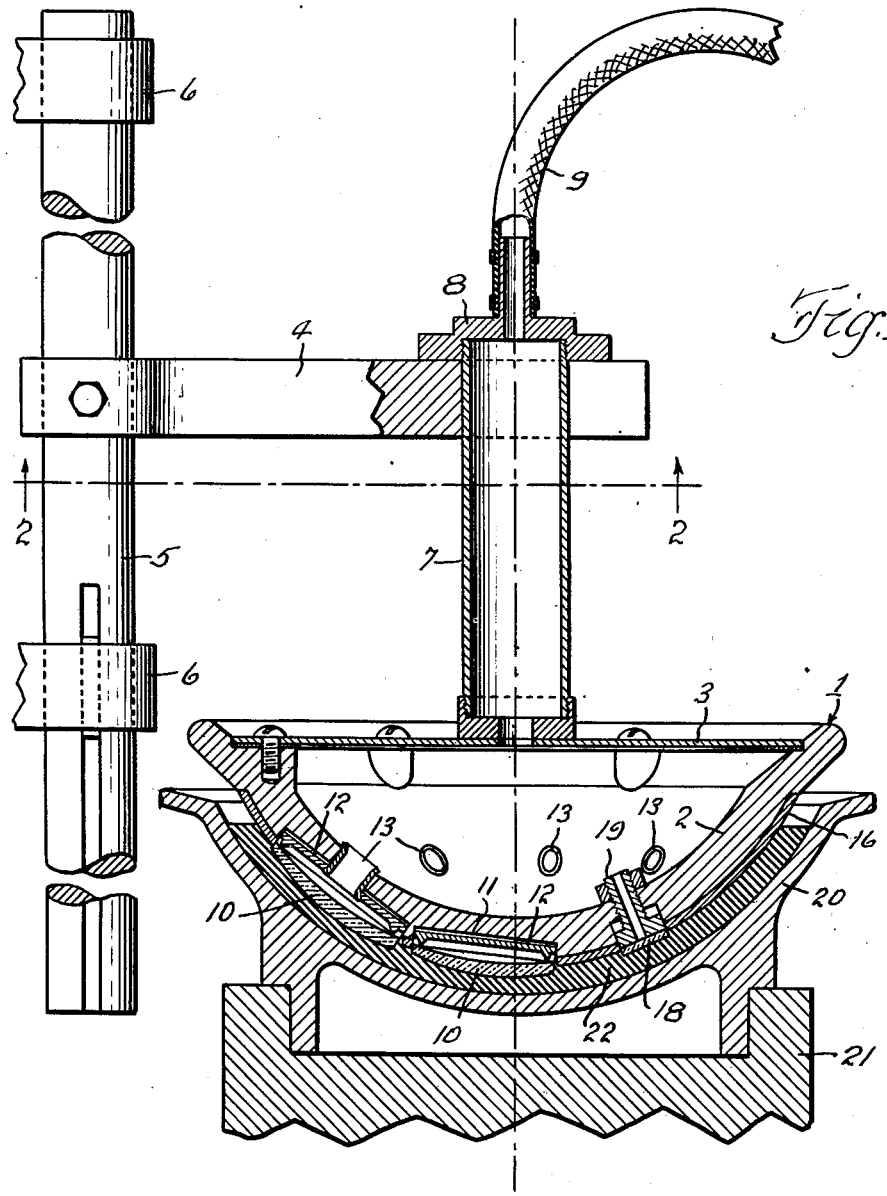
Fig. 1 is a median section of the complete apparatus taken on the plane of lines 1—1 of Figs. 3 and 4, parts being in elevation.
Figure 2:
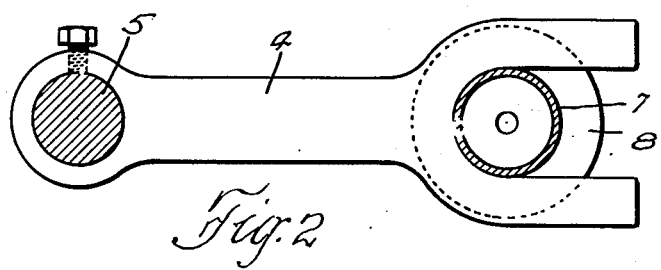
Fig. 2 is a sectional detail on the plane of line 2—2 of Fig. 1.

The vacuum mold 1 has a cast iron hollow body 2 which is shown as hemi-spherical. A cover 3 is attached by screws, and with the aid of a suitable gasket closes the interior. It is shown as controlled by a bifurcated handle 4 that is attached to a guide rod 5 which slides in bearings 6, being splined to prevent turning. A tube 7 of brass or the like extends axially up from the cover 3 and communicates with the hollow interior of the vacuum mold through a hole in the cover. A cap 8 on the top end of the tube 7 rests on the bifurcated arms of handle 4 and limits the downward movement of the mold with respect to the handle. A flexible hose 9 is attached to a nipple extension on the top of cap 8 and communicates with the interior of tube 7 through an axial opening in cap 8, and also with a vacuum pump (not shown). Thus the interior of the vacuum mold is evacuated.

The vacuum mold is made to desired radius to accommodate the various lens powers that are necessary for the second side of the lens. The illustrated mold accommodates eight lenses, numbered 10. The spherical wall 2 is provided with eight properly spaced vent holes which enter axially into circular recesses 11 of substantially the same size as the lenses 10. The vent openings are radially disposed and the bottoms of the recesses are tangential.

Disposed in the recesses 11 are lens positioning and holding members 12, termed lens spots, having connection with the interior of the mold so as to provide suction when the lenses are held by them. In the form shown, these are cup shaped members, each having a ring lip on which the lens rests and provides a seal. The bottom has a central opening, and a hollow or tubular rivet 13 fits in this central opening and is spun over the bottom of the lens spot to make an hermetic seal. The rivet extends through the vent in the wall 2 and is spun over the inside of the wall, thus fastening the lens spot in its recess.

The angular position of the lens spot is determined by the setting of screw studs 14, and the final securing is done by screws 15 that pass through the bottom of the lens spot and screw into the wall 2. The adjustment of the screw studs 14 is such that the plane of the supporting ring of the lens spots 12 is tangential to the surface of the vacuum mold. After the lens spots 12 are in place, at the right height and in proper tangential position, they are lapped with fine emery to assure of the greatest accuracy in the location of the annular supports for the lenses. Then a brass shell 16 of the precise thickness required is applied to the spherical surface and attached by screws 17. These screws are shown as countersunk and the cavity is filled with lead or the like. The thickness of the shell 16 determines the extent to which the lenses are embedded in the pitch, and hence the extent to which the surface to be ground extends above the pitch. These proportions are, therefore, accurately determined. The shell is provided with openings corresponding in size to and registering with the recesses 11.

To apprise the operator when the limit of grinding is reached, a gauge or spot member 18, such as glass, is also applied to the vacuum mold and held by suction so as to be left in the pitch along with the lenses. The radial position of this so-called spot glass is regulated so that it is not touched by the grinding lap until a predetermined thickness of glass has been ground from the lenses. Customarily, for example, the spot glass 18 is set out four-tenths of a millimeter farther than the planes of the rings of the lens spots 12, so that the eventually exposed face of the spot glass is four-tenths of a millimeter lower in the block than are the exposed rough ground minus faces of the lenses. When the lap has removed glass from the lens faces to the thickness of four-tenths of a millimeter, the spot glass begins to show marks of abrasion, and the operator knows that the fine grinding has progressed far enough. The surfaces may then be polished and finished with rouge.

This application of the spot glass 18 is effected by a suction chuck or nipple 19 which screws into the wall 2, being adjustable in and out to the right radial position, and finally secured by a lock nut, as shown. This nipple 19 is radial in the holder wall and its outer face, against which the spot glass is applied and held, is accurately lapped to a tangential plane, so that the exposed surface of the spot glass in the block will be tangential.

The block 20 is a cast iron hemi-spherical shell complementary to the mold, differing in radius only by the average thickness of the pitch. This block 20 is put in a precision holder 21 directly under the vacuum mold. A quantity of pitch 22 in the molten state is put in the block, and the vacuum mold spreads the pitch. The descent of the mold is controlled by the handle 4 and is stopped when the pitch rises to the top of the block. The lenses and the spot glass are immersed in the pitch the predetermined amount controlled by the setting of the screw studs 14 and the nipple 19, and the parts are held there until the pitch is hardened. The lenses are thus properly blocked for the fine grinding and polishing, which is done by a lap that replaces the vacuum mold.

It will be appreciated that this method eliminates all of the liability for error that is present in hand pressing and blocking, and reduces the time and hence the cost of manufacture.

While the method has been illustrated by means of apparatus designed to block up the lenses for grinding of their minus sides, it will be understood that the method is also applicable to blocking for grinding of the plus sides of meniscus lenses and blanks, and that the invention is not limited to the particular apparatus shown, but that other embodiments will occur to those skilled in the art within the spirit and scope of the invention as defined in the following claims.

What is claimed is:

1. A lens blocking apparatus comprising a hollow spherical member arranged to have its interior exhausted and having a plurality of vents through its wall distributed over the surface thereof, a recess in the surface surrounding each vent, a lens receiving member in the form of a ring disposed in each recess the interior of which is hermetically sealed with the vent, the planes of the exposed edges of the rings being tangential to the spherical surface and equidistant from its spherical center, and a suction nipple radially adjustable in the wall of the member and having its outer face tangential to the surface and disposed at a slightly greater radial distance from the spherical center of the member than that of planes of the exposed edges of the rings.

2. A lens blocking apparatus comprising a hollow spherical mold arranged to have it its interior exhausted and having a plurality of vents through its wall distributed over the surface thereof, a recess in the exterior surface surrounding each vent, a lens receiving member in the form of a cup seated in each recess and having an opening in its bottom, and a hollow rivet passing through each opening and its corresponding vent and providing sealed communication between the interior of the cup and the interior of the member, the planes of the exposed annular edges of the lens receiving members being tangential to the spherical surface of the member and equidistant from its spherical center.

3. A lens blocking apparatus comprising a hollow spherical mold arranged to have its interior exhausted and having a plurality of vents through its wall distributed over the surface thereof, a recess in the exterior surface surrounding each vent, a lens receiving member in the form of a cup seated in each recess and having an opening in its bottom, a hollow rivet passing through each opening and its corresponding vent and providing sealed communication between the interior of the cup and the interior of the member, the planes of the exposed annular edges of the lens receiving members being tangential to the spherical surface of the member and equidistant from its spherical center, and a suction nipple radially adjustable in the wall of the member and having its outer face tangential to the surface and disposed at a slightly greater radial distance from the spherical center of the member than that of the planes of the exposed annular edges of the lens receiving members.

4. A lens blocking apparatus comprising a hollow spherical mold arranged to have its interior exhausted and having a plurality of spot recesses in its surface to receive lens blanks to be ground, each recess being vented to the interior of the mold, a separate outwardly opening cup member axially disposed in each recess and having an opening in its bottom hermetically sealed to the vent of its recess and communicating therewith, means for securing the cup in its recess, said means being adjustable to control the angular disposition of the plane of the annular edge of the cup rim, and a suction nipple radially adjustable in the wall of the spherical mold and having its outer face tangential to the surface of the mold.

GEORGE A. CLEMENT.

REFERENCES CITED

The following references are of record in the file of this patent:

UNITED STATES PATENTS

| Number | Name | Date |
|---|---|---|
| 689,933 | Underwood | Dec. 31, 1901 |
| 949,760 | Flad | Feb. 22, 1910 |
| 995,393 | Witmer | June 13, 1911 |
| 1,284,283 | Flad | Nov. 12, 1918 |
| 1,332,778 | Taylor et al. | Mar. 2, 1920 |
| 1,436,626 | Spaander | Nov. 21, 1922 |
| 1,438,100 | Dey | Dec. 5, 1922 |
| 1,456,673 | Dey | May 29, 1923 |
| 1,588,435 | Adams | June 15, 1926 |

FOREIGN PATENTS

| Number | Country | Date |
|---|---|---|
| 353,910 | Germany | May 29, 1922 |
| 401,399 | Germany | Sept. 3, 1924 |
| 460,049 | France | Nov. 21, 1913 |